United States Patent [19]

Kanda et al.

[11] Patent Number: 4,769,398

[45] Date of Patent: * Sep. 6, 1988

[54] ANTIFOULING COATING COMPOSITION HAVING IMPROVED POLISHING PROPERTY

[75] Inventors: Kazunori Kanda, Osaka; Ryuzo Mizuguchi, Kyoto, both of Japan

[73] Assignee: Nippon Paint Co., Ltd., Osaka, Japan

[ * ] Notice: The portion of the term of this patent subsequent to Jun. 1, 1988 has been disclaimed.

[21] Appl. No.: 853,842

[22] Filed: Apr. 18, 1986

[30] Foreign Application Priority Data

Apr. 18, 1985 [JP] Japan ................................. 60-083439

[51] Int. Cl.$^4$ ........................ C08G 63/02; C09D 5/16; C09D 5/14
[52] U.S. Cl. .................... 523/122; 523/177; 523/206
[58] Field of Search ........................ 523/122, 177, 206

[56] References Cited

U.S. PATENT DOCUMENTS

| | | | |
|---|---|---|---|
| 4,086,297 | 4/1978 | Rei et al. ............................. | 523/122 |
| 4,104,234 | 8/1978 | Bednarski et al. .................... | 523/177 |
| 4,139,515 | 2/1979 | Dennington ......................... | 523/177 |
| 4,465,795 | 8/1984 | Sunano et al. ...................... | 523/122 |
| 4,482,701 | 11/1984 | Yamamori et al. .................. | 524/603 |
| 4,485,197 | 11/1984 | Yokoi et al. ......................... | 523/177 |
| 4,499,223 | 2/1985 | Yamamori et al. .................. | 523/124 |
| 4,576,838 | 3/1986 | Rosen et al. ......................... | 523/122 |
| 4,599,368 | 7/1986 | Kimmel et al. ...................... | 523/122 |

FOREIGN PATENT DOCUMENTS

| | | | |
|---|---|---|---|
| 0174453 | 10/1983 | Japan ................................. | 523/122 |
| 0183762 | 10/1983 | Japan ................................. | 523/122 |

*Primary Examiner*—Herbert J. Lilling
*Attorney, Agent, or Firm*—Wenderoth, Lind & Ponack

[57] ABSTRACT

An antifouling coating composition having improved polishing property and consisting essentially of
(a) a film-forming synthetic resin,
(b) a solvent in which the synthetic resin is soluble or dispersible, and
(c) crosslinked polymer microparticles having a mean diameter of about 0.01 to 50 microns and carrying an antifouling agent with them, the polymer microparticles being insoluble in the solution of said (a) in said (b) and uniformly dispersed therein, either of said (a) or (c) being of hydrolyzable nature.

The coating composition has an excellent application characteristics, it is capable of being applied in a thicker coating and causes low environmental pollution.

8 Claims, No Drawings

ANTIFOULING COATING COMPOSITION HAVING IMPROVED POLISHING PROPERTY

FIELD OF THE INVENTION

The present invention relates to an antifouling coating composition having improved polishing property. More specifically, the invention concerns an antifouling coating composition which is excellent in application characteristics and is capable of being applied in a thicker coating and with which a diminished environmental pollution can be realized because the polishing rate is appropriately controlled and the metal dissolution be maintained at a lower level.

BACKGROUND OF THE INVENTION

The application of an antifouling coating composition comprising a binder resin and an antifouling agent onto the surfaces of ship's bottom or underwater constructions has been practiced for a long time.

However, in such coating compositions, since the binder resin is usually of resistant nature to the attack of sea water and the like and the antifouling effect is entirely dependent on the antifouling agent dissolved out of the coating, even though the applied coating is effective at the beginning stage when a high speed of dissolution is obtained at the surface of said coating, the rate of dissolution is lowered as it comes into the stage wherein the dissolution is originated from the diffusion phenomenon caused by the concentration gradient of the antifouling agent contained. And thus, the coating will lose its effectiveness in a comparatively shorter period of time. Furthermore, after said dissolution, the coating will form a skeleton structure, which in turn causes, in case of ship, a speed loss and an increase in fuel expense. Under the circumstances, an antifouling paint based on a hydrolysis type resin having incorporated therein an antifouling component and especially an organo tin component has become the center of public attention.

In this type of coating composition, tributyl tin groups are, in general, contained in the binder resin via ester bonds and during sailing, these toxic tributyl tin groups are gradually released from the resin through hydrolysis in a weak alkaline sea water and at the same time, the resin per se will get a number of hydrophilic groups, becomes soluble and will be gradually dissolved into sea water. Thus, the coating shows a self-polishing characteristic and hence, this type of coating composition is far superior to other heretofore proposed compositions in that most of the antifouling agent contained in the coating are effectively utilized as the toxicant.

However, to get an appropriate hydrolysis rate and an optimum polishing rate, it is usually required to provide a fairly large number of hydrolysis sites, i.e. organo tin bonding sites, in the resin. This also provides hygienic and economical problems as might be easily understood. As an attempt to decrease the amount of organo tin compound required, Japanese Patent Application Kokai No. 118868/83 suggests the inclusion of number of hydroxyl groups in the resin, but this is rather difficult to do and obtain a good result.

SUMMARY OF THE INVENTION

An object of the invention is, therefore, to provide a self-polishing antifouling coating composition with the least amount of organo tin compound or with less expensive antifouling components than said organo tin compound.

A further object of the invention is to provide a self-polishing antifouling coating composition with non-hydrolysis type binder resin. A further object of this invention is to provide an antifouling coating composition having an excellent application characteristics and capable of being applied in a thicker coating. Other objects of the invention shall become clear from the following description of the specification and claims attached hereto. According to the present invention, the aforesaid and other objects are attained by providing an antifouling coating composition consisting essentially of (a) a film-forming synthetic resin
(b) a solvent in which the synthetic resin is soluble or dispersible, and
(c) crosslinked polymer microparticles having a mean diameter of about 0.01 to 50 microns and carrying an antifouling agent with them, the polymer microparticles being insoluble in the solution of said synthetic resin in said solvent and being uniformly dispersed therein, and either of said (a) or (c) being of hydrolyzable nature.

DESCRIPTION OF THE PREFERRED EMBODIMENTS

The polymer microparticles carrying an antifouling agent may be of a hydrolyzable nature or of non-hydrolyzable nature and the polymer per se may be of various kinds depending on the antifouling agent used and the manner in which they are carried. In this specification and claims, the term "of hydrolyzable nature" denotes a resin which is hydrolyzed, dissolved or swollen in an weak alkaline aqueous medium as in sea water. These properties are clearly dependent on alkalinity. However, since the mean diameter is limited to about 0.01 to 50 microns for the reasons hereinafter stated, preference is given to an acrylic resin prepared by the copolymerization of ethylenically unsaturated monomers, a part of which consists of a crosslinking monomer.

When an organic tin compound, e.g. tributyl tin compound is selected as an antifouling agent and said agent is chemically bound in the molecular structure of the binder resin, it is preferred to prepare the polymer microparticles by the copolymerization of an organo tin bearing, polymerizable monomer, ethylenically unsaturated monomer(s) and a crosslinking monomer. In this copolymerization, these monomers are reacted in an aqueous medium by emulsion polymerization or suspension polymerization means, to obtain an aqueous dispersion of crosslinked polymer microparticles, from which the aqueous medium is removed by solvent substitution, azeotropic distillation, centrifugal separation, drying and the like. It is also possible to copolymerize said monomers in a non-aqueous type, organic solvent, which may dissolve the monomers but not the polymer prepared, as, for example, low SP solvent like aliphatic hydrocarbons and high SP esters, ketones or alcohols. The latter may also be known as the NAD method or precipitation polymerization method.

In these methods, an anionic, cationic or nonionic compound having an emulsifying power is customarily used. Among them, particular preference is given to amphoionic groups bearing compounds including polymerizable monomers, oligomers, polymers and surfactants with said groups. They are shown, for example, in Japanese Patent Application Kokai No. 129066/83 and Japanese Patent Application No. 119380/85. Regardless of the method used, the present polymer microparticles should preferably have a mean diameter of about 0.01 to 50 microns from the standpoint of miscibility, reactivity and storage stability required.

The ethylenically unsaturated monomers may be, for example, an alkyl acrylate or methacrylate as methyl acrylate, methyl methacrylate, ethyl acrylate, ethyl methacrylate, n-butyl acrylate, n-butyl methacrylate, isobutyl acrylate, isobutyl methacrylate, 2-ethyl hexyl acrylate, 2-ethyl hexyl methacrylate and the like, and other ethylenically unsaturated monomers copolymerizable therewith like styrene, α-methyl styrene, vinyl toluene, t-butyl styrene, ethylene, propylene, vinyl acetate, vinyl propionate, acrylonitrile, methacrylonitrile, dimethylaminoethyl acrylate, dimethylaminoethyl methacrylate and the like. These monomers may be used either singularly or in combination of 2 and more.

The crosslinking monomer, when used, may be any of the monomer having 2 and more ethylenically unsaturated double bonds in its molecule or the combination of 2 monomers each bearing a mutually reactive functional group.

Examples of the monomer having 2 and more ethylenically unsaturated double bonds in its molecule are polymerizable unsaturated monocarboxylate esters of polyhydric alcohols, polymerizable unsaturated alcoholate esters of polycarboxylic acids, and aromatic compounds substituted with 2 or more vinyl groups and the like.

Typical examples are ethylene glycol diacrylate, ethylene glycol dimethacrylate, triethylene glycol dimethacrylate, tetraethylene glycol dimethacrylate, 1,3-butylene glycol dimethylacrylate, trimethylol propane triacrylate, trimethylol propane trimethacrylate, 1,4-butanediol diacrylate, noepentyl glycol acrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxymethyl ethane diacrylate, 1,1,1-trishydroxy methyl ethane triacrylate, 1,1,1-trishydroxy methyl ethane dimethacrylate, 1,1,1-trishydroxy methyl ethane trimethacrylate, 1,1,1-trishydroxy methyl propane diacrylate, 1,1,1-trishydroxy methyl propane triacrylate, 1,1,1-trishydroxy methyl propane dimethacrylate, 1,1,1-trishydroxy methyl propane trimethacrylate, triallyl cyanurate, triallyl isocyanurate, triallyl trimellitate, diallyl terephthalate, diallyl phthalate and divinyl benzene.

Examples of the combination of 2 ethylencially unsaturated monomers each bearing a mutually reactive functional group are the combination of epoxy bearing ethylenically unsaturated monomer (e.g. glycidyl acrylate, glycidyl methacrylate) and carboxyl bearing ethylenically unsaturated monomer (e.g. acrylic acid, methacrylic acid and crotonic acid).

Other combinations of mutually reactive functional groups are amine and carbonyl; epoxide and acid anhydride, amine and acid chloride, alkylene imine and carbonyl, organo alkoxy silane and carboxyl, hydroxyl and isocyanate and the like.

When the crosslinking monomers are used as a part of the α,β-ethylenically unsaturated monomers, the maximum content should preferably be limited to up to 80% of the total monomers used.

As the organo tin bearing copolymerizable monomers, mention is made of tributyl tin acrylate, tributyl tin methacrylate, triphenyl tin acrylate, triphenyl tin methacrylate and the like. Other organo tin bearing copolymerizable monomers include the reaction products of at least one organo tin compounds selected from the group consisting of tributyl tin oxide, triphenyl tin hydroxide, triphenyl tin chloride, triphenyl tin acetate, triphenyl tin fluoride, bis-triphenyl tin oxide, bis-triphenyl tin α,α'-dibromsuccinate, bis-triphenyl tin α,α'-chloroacetate, and bis-triphenyl tin α,α'-nicotinate and at least one ethylenically unsaturated carboxylic acids selected from acrylic acid, methacrylic acid, itaconic acid, maleic acid and fumaric acid. Of course, esterification products of other metallic compounds and carboxyl bearing ethylenic monomers may be satisfactorily used. Such metals include, for example, Cu, Ni, Co, Zn, Mn, Mg, Ba and Ca as disclosed in Japanese Patent Application Kokai No. 67761/83.

The polymer microparticles prepared in an aqueous or non-aqueous organic medium are separated from the reaction system by the adoption of filtering, spray drying, freeze-drying and the like and thus separated particles are, as they are or after being pulverized to an appropriate size, used in the invention.

Alternatively, the thus obtained dispersion is subjected to a solvent substitution and used in other solvent dispersion form.

General speaking, the grain size of the microparticles may preferably be controlled by the preparation method used. An emulsion polymerization is most suitable for the preparation of polymer microparticles having an average grain size of about 0.01 to 0.6 microns, NAD method for the polymer microparticles of 0.01 to 0.6 micron size, precipitation polymerization for the microparticles of 0.2 to 2 microns and suspension polymerization for the microparticles of 1 to 50 microns.

The antifouling agent bearing polymer microparticles may also be prepared according to any of the aforesaid methods, but substituting a common resin varnish for the disclosed reaction medium.

At this time, crosslinked polymer may be prepared on the varnish resin.

The present polymer microparticles may also be obtained by using a monomer soluble antifouling agent and copolymerizing ethylenically unsaturated monomers including a crosslinking monomer in the presence of said antifouling agent.

Alternatively, the polymer microparticles may be prepared by using a monomer insoluble antifouling agent in a similar way, but at this time, the thus formed crosslinked polymer microparticles are of considerable size and have the coating of the antifouling agent used.

In an another method, the crosslinked polymer microparticles are first prepared in a usual way, and after being pulverized, the particles are mixed well with an antifouling agent, thereby producing the crosslinked polymer microparticles carrying the antifouling agent therewith. At this time, the antifouling agent may be occluded in or adhered on the surfaces of said microparticles. When selecting the last mentioned method, there is no need for the antifouling agent to be of the reactive type and any of the known antifouling agents may advantageously be used. In the present invention, the thus obtained, crosslinked polymer microparticles carrying an antifouling agent are uniformly dispersed in a resin varnish consisting essentially of a film-forming synthetic resin and a solvent, including an optional antifouling agent and other additives. The resin varnish may be any of the varnishes customarily used in a coating composition. The film-forming synthetic resin may be, for example, polyester resin, acrylic resin, polyamide resin, polyvinyl chloride, acryl-vinylacetate resin, chlorinated rubber, urethane resin, boil oil and the like. They may be of either hydrolyzable or non-hydrolyzable nature.

They may take any of the known binder systems heretofore used in an antifouling coating composition as, for example, a self-polishing type as in tributyl tin (meth) acrylate, a hydron system type as in hydroxy methyl acrylate and methyl methacrylate copolymer, a hydrophilic graft polymer as in graft copolymer of hydrophilic acrylic monomers, a two-liquid type as in the combination of rosin, cuprous oxide and triphenyl tin hydroxide, a system wherein a non-reactive, dissolution promoter is included therein, a water washing type and the like.

As the solvent, any of the known organic solvents customarily used in an antifouling paint may satisfactorily used as, for examples, aliphatic hydrocarbons, aromatic hydrocarbons, halogenated hydrocarbons, alcohols, ketones, esters, ethers, alcohol-esters, ketone-alcohols, ether-alcohols, ketone-ethers, ketone-ester, ester-ethers and the like.

The solvent may also be an aqueous medium. In this invention, when the crosslinked polymer microparticles carrying an antifouling agent are of hydrolyzable nature in a coating composition, the solvent is preferably selected from the organic ones and when the microparticles carrying an antifouling agent are of non-hydrolyzable nature, the solvent may be of aqueous or non-aqueous nature.

The present antifouling coating composition may further include other antifouling agents as, for example, heavy metal compound, thiocarbamate and the like, if desired. Thus, in the present invention, a variety of coating compositions are included as, for example, combination of the present crosslinked polymer microparticles carrying an antifouling agent (P) and non-hydrolyzable type resin binder; combination of said (P), non-hydrolyzable type resin binder and additional antifouling agent; combination of said (P) and hydrolyzable type (or self-polishing type) resin binder; and combination of said (P), hydrolyzable type resin binder and other antifouling agent, and the like.

As for the hydrolyzable resins, reference should be directed to as, for example, Japanese Patent Application Nos. 165921/81 (now laid open as Kokai No. 67761/83); 165923/81 (as Kokai No. 67767/83) and 150982/82 (as Kokai No. 118868/83). The antifouling agent can be, as already stated, carried by the polymer microparticles in various ways and any of the known antifouling agents may satisfactorily be used, including the following:

1. trialkyl tin compounds:

e.g. tributyl tin oxide, tributyl tin hydroxide, tributyl tin chloride, tributyl tin acetate, tributyl tin fumarate, bis (tri-n-butyl tin) mesodibromo succinate, bis (tri-n-butyl tin) oxide 2. triphenyl tin compounds:

e.g. triphenyl tin hydroxide, triphenyl tin chloride, triphenyl tin fluoride, triphenyl tin acetate, triphenyl tin dimethyl dithio carbamate, triphenyl tin versatate, triphenyl tin nicotinate, triphenyl tin α,α'-dibromo succinate, and triphenyl tin mono-chrom acetate 3. triphenyl leads:

e.g. triphenyl lead acetate, tributyl lead acetate 4. thiocarbamates:

e.g. zinc dimethyl dithiocarbamate, tetramethyl thiuram disulfide 5. copper compounds:

e.g. cuprous oxide, cuprous thiocyanate, copper rhodanate, copper phosphide, copper naphthenate, copper octoate, alkyl mercaptan copper methyl 6. others:

e.g. antimony oxide, mercuric oxide arsenitic anhydride, 2,4-dichlorophenoxy acetic acid, 2-methyl-4-chlorophenoxy acetic acid, pentachlor-phenol dodecylamine, pentachlorphenol, triphenyl borane amine.

The invention however should not be limited on the abovesaid antifouling agents and other known antifouling agents may satisfactorily be used.

The novelty of the present invention in the point that the crosslinked polymer microparticles having a mean diameter of about 0.01 to 50 microns and carrying an antifouling agent are uniformly dispersed in a conventional antifouling coating composition or the coating composition similar to them.

Such particles are in existence in the coating in very fine forms and when the constituting resin is of hydrolyzable type, the particles per se will be gradually hydrolyzed and dissolved in sea water and the carried antifouling agent is released therefrom.

However, the microparticles are, depending on the type of binder resin, likewise physically releasable from the said binder as the binder resin is hydrolyzed and dissolved or swollen in sea water. Therefore, the present coating composition may be clearly distinguished from the heretofore proposed non-polishing type antifouling coating compositions in that even in the combination of non-hydrolyzable type resin binder and antifouling agent bearing polymer microparticles, the desired polishing effect can be attained with the coating of the present invention because of the falling of the microparticles as abovementioned. In the case when a hydrolyzable type synthetic resin is used as a binder resin, the desired antifouling effect can be expected from the polymer microparticles, binder resin and if any, an antifouling agent added. Therefore, in the present invention, there is no need to control the hydrolysis rate of the polymer microparticles and that of the binder resin as is the case with the prior compositions, and hence, the required organo tin compound can be markedly cut down.

Since the resinous content of the coating composition can be increased with the present polymer microparticles without the fear of increase in the present coating composition can be applied in a thicker coating and shows an excellent application characteristic as compared with those of the heretofore proposed compositions.

In order to get such application characteristic, the polymer microparticles, howver, should have a mean grain diameter of about 0.01 to 50 microns.

This is because the required thixotropic properties cannot be given to the composition with the polymer microparticles of less than 0.01 micron or the microparticles of more than 50 microns.

It has also been found that the polymer microparticles having a mean diameter of about 0.01 to 50 microns are best suited for practical use in controlling the polishing rate in an optimum range.

In this invention, the solid weight ratio of film-forming synthetic resin (a) to polymer microparticles (c) can be selected in a comparatively wide range and however, it is, in general, in a range of 99.9/0.1 to 30/70, and preferably 99.5/0.5 to 60/40.

Thus the amount of said polymer microparticles in the present coating composition can be determined in a wide range, and however, for the purpose of obtaining an improved application characteristic, it is specifically preferred to use about 0.1 to 50% by weight of the polymer microparticles based on the total sold content of the coating composition.

The invention shall be now more fully stated in the following Examples, which however should not be taken as being of limitative in any sense. Unless otherwise stated, all parts and percentage are by weight.

REFERENCE EXAMPLE 1

Preparation of emulsifier having amphoionic groups

Into a 2 liter flask fitted with stirrer, nitrogen gas inlet tube, thermo regulator, condenser and decanter, were placed 134 parts of bis-hydroxy ethyl taurine, 130 parts of neopentyl glycol, 236 parts of azelaic acid, 186 parts of phthalic anhydride, and 27 parts of xylene and the mixture was heated while removing the formed water azeotropically. The temperature was raised to 190° C. in about 2 hours from the commencement of reflux, stirring and dehydration were continued until the acid value reached to 145 and the mixture was allowed to cool to 140° C.

While maintaining the temperature at 140° C., 314 parts of glycidyl versatate (Cardula E10, trade mark of Shell Co.) were dropwise added in 30 minutes and the combined mixture was further stirred for 2 hours and the reaction was overed. Thus obtained polyester resin had an acid value of 59, a hydroxyl number of 90 and a number average molecular weight (Mn) of 1054.

REFERENCE EXAMPLE 2

Preparation of emulsifier having amphoionic groups

Into a similar reaction vessel as used in Reference Example 1, were placed 73.5 parts of sodium salt of taurine, 100 parts of ethylene glycol, and 200 parts of ethylene glycol monomethyl ether and the mixture was heated under stirring to 120° C.

After the content became a uniform liquid, a solution of 470 parts of Epicoat 1001 (bisphenol A-diglycidyl ether type epoxy resin, epoxy equivalent 470, trade mark of Shell Chem. Co.) and 400 parts of ethylene glycol monomethyl ether was dropwise added in 2 hours and after completion of said addition, the mixture was further stirred at 120° C. for 20 hours and the reaction was overed. From this reaction mixture, 518 parts of modified epoxy resin were obtained, whose acid value (KOH titration) was 49.4 and sulfur content (X-ray fluorescent analysis) was 2.8%.

REFERENCE EXAMPLE 3

Into one liter reaction vessel fitted with reflux condenser, dropping funnel, stirrer and thermo regulator, were placed 100 parts of copper 12-hydroxy stearate, 245.5 parts of phthalic anhydride and 25 parts of toluene, and the mixture was heated to 100° C. Thereafter, 191 parts of 1,6-hexanediol and 1 part of dibutyl tin oxide were added, the mixture was heated under nitrogen gas stream to 160° C. and the condensation reaction was continued for 8 hours while removing the formed water out of the system. At that time, the liquid temperature was gradually raised in proportion to the increase in dehydration and finally reached to 180° C. Thereafter, the reaction mixture was allowed to cool to 110° C. and diluted with 263 parts of methyl isobutyl ketone. A deep green varnish (A) having a solid content of 62.7%, a Gardner viscosity of 0, and a resinous acid value of 9.7 was obtained.

REFERENCE EXAMPLE 4

Preparation of polymer microparticles

Into a 1 liter reaction vessel fitted stirrer, condenser, and thermo regulator, were placed 380 parts of deionized water, 50 parts of the emulsifier having amphoionic groups obtained in Reference Example 1 and 5 parts of dimethyl ethanol amine and the mixture was melted, while stirring, at 80° C. Next, a solution of 2.5 parts of azobiscyano valeric acid in 50 parts of deionized water and 1.6 parts of dimethyl ethanol amine and a mixed solution of 100 parts of tributyl tin methacrylate, 75 parts of ethylene glycol dimethacrylate, 40 parts of styrene and 35 parts of n-butyl acrylate were simultaneously and dropwise added in 90 minutes and after said addition, the combined mixture was further stirred for 90 minutes to obtain an aqueous dispersion of polymer microparticles having a mean diameter of 48 nm, the solid content being 42%. A part of said aqueous dispersion was then subjected to a freezing drying to obtain the polymer microparticles in powder form.

REFERENCE EXAMPLE 5

Preparation of polymer microparticles

Into a 1 liter reaction vessel fitted with stirrer, condenser, and thermo regulator, were placed 370 parts of deionized water, 40 parts of the emulsifier having amphoionic groups obtained in Reference Example 2 and 1.5 parts of dimethyl ethanol amine, and the mixture was melted, under stirring, at 80° C.

To this, a solution of 4.5 parts of azobiscyano valeric acid in 45 parts of deionized water and 4 parts of dimethyl ethanol amine was added, and thereafter, a thoroughly mixed solution of 40 parts of styrene, 50 parts of ethylene glycol dimethacrylate, 60 parts of methyl methacrylate, 60 parts of n-butyl acrylate, 6 parts of 2-hydroxyethyl acrylate, 12 parts of tributyl tin methacrylate and 12 parts of bis-tributyl tin oxide was dropwise added in 60 minutes.

Finally, a solution of 1.5 parts of azobiscyano valeric acid in 15 parts of deionized water and 1.0 parts of dimethyl ethanol amine was added and the combined mixture was stirred at 80° C. for 60 minutes to obtain an aqueous dispersion of polymer microparticles having a non-volatile content of 36% and a mean grain diameter of 60 nm.

REFERENCE EXAMPLE 6

Preparation of polymer microparticles

Into a 1 liter reaction vessel fitted with stirrer, condenser, and thermo regulator, were placed 1000 parts of deionized water and 30 parts of polyvinyl alcohol (average molecular weight 1500), and the mixture was, while stirring at 1000 rpm and introducing a nitrogen gas stream, heated to 60° C. To this, a mixture of 20 parts of tributyl tin methacrylate, 13 parts of methyl methacrylate, 2 parts of 2-hydroxyethyl acrylate, 15 parts of divinyl benzene and 1 part of 2,2-azobis-(2,4-dimethyl valeronitrile) (polymerization initiator) was dropwise added in 1 hour. After said addition, the temperature of the reaction mixture was raised to 70° C. and the reaction was continued for additional 5 hours to obtain a suspension liquid of polymer microparticles. The suspension liquid was then subjected to a centrifugal separation, and the separated polymer microparticles were recovered and again dispersed in deionized water. Repeating the same separation means for additional two times, the desired polymer microparticles were obtained in powder form. An average grain diameter of said microparticles was 7.5 microns.

REFERENCE EXAMPLE 7

Preparation of polymer microparticles

Into a 1 liter reaction vessel fitted with stirrer, condenser, and thermo regulator, were placed 900 parts of isopropyl alcohol and the content was heated, while introducing a nitrogen gas stream, to 50° C. To this, was dropwise added a mixed solution of 5 parts of the varnish A obtained in Reference Example 3, 15 parts of tributyl tin methacrylate, 10 parts of methyl methacrylate and 25 parts of ethylene glycol methacrylate in 10 minutes.

Next, 1 g of azobis isobutyronitrile was added and the mixture was gradually heated to 70° C. and reacted for 4 hours. Thus formed white precipitate was filtered, washed three times with isopropyl alcohol and dried in vacuo to obtain the polymer microparticles in powder form. Mean diameter of said particles was $1.2\mu$.

REFERENCE EXAMPLE 8

Preparation of polymer microparticles

Into a 1 liter reaction vessel fitted with stirrer, condenser, and thermo regulator, were placed 1000 parts of deionized water, 20 parts of polyvinyl alcohol (average molecular weight 1500), 10 parts of dodecyl benzene sulfonate neutralized with dimethyl ethanol amine and 10 parts of Ludox AM (aqueous colloidal silica solution, trade mark of Du Pont) and the mixture was, while stirring at 1000 rpm and introducing a nitrogen gas stream, heated to 60° C. To this, a mixture of a dispersion of 7.5 parts of triphenyl tin hydroxide, 15 parts of methyl methacrylate, 5 parts of tributyl tin methacrylate, 5 parts of acrylonitrile, 5 parts of styrene and 20 parts of ethylene glycol dimethacrylate previously thoroughly mixed in a porcelain pot mill for 20 hours, and 1 part of 2,2'-azobis-(2,4-dimethyl valeronitrile) was dropwise added in 1 hour and after completion of said addition, the reaction mixture was heated to 70° C. and reacted for 5 hours to obtain a suspension of polymer microparticles. This suspension was subjected to a cetrifugal separation and the separated particles were again dispersed in deionized water.

Repeating the same procedures three times, the desired polymer microparticles were obtained in powder form, mean diameter of which was 25 microns.

REFERENCE EXAMPLE 9

Into a 1 liter reaction vessel fitted with reflux condenser, dropping funnel, stirrer and thermo regulator, were placed 50 parts of xylene, 30 parts of methyl isobutyl ketone and 20 parts of n-butanol and the mixture was maintained at 90° C. To this, a mixed solution of 10 parts of tributyl tin methacrylate, 25 parts of methyl methacrylate, 20 parts of styrene, 10 parts of methyl acrylate, 35 parts of hydroxypropyl acrylate and 1.4 part of azobisisobutyronitrile was dropwise added in 4 hours and the mixture was maintained at the same temperature for additional 2 hours to obtain a varnish B having a solid content of 49.6%.

A number average molecular weight of the resin was 1400.

REFERENCE EXAMPLE 10

Repeating the same procedures as stated in Reference Example 9, but using 60 parts of xylene, 65 parts of tributyl tin methacrylate, 35 parts of methyl methacrylate and 1.6 parts of azobis isobutyronitrile, a varnish C having a solid content of 62%, number average molecular weight of the resin contained being 1100, was obtained.

REFERENCE EXAMPLE 11

A resin varnish D was obtained by mixing 50 parts of methyl isobutyl ketone, 100 parts of xylene, 75 parts of WW rosin and 75 parts of polyvinyl chloride (VYHH resin) and heating the same. The solid content of said varnish was 50%.

REFERENCE EXAMPLE 12

Into a similar reaction vessel as used in Reference Example 4, were placed 5 parts of the emulsifier having amphoionic groups obtained in Reference Example 2, neutralized with dimethyl ethanolamine.

Thereafter, a solution of 2 parts of azobiscyano valeric acid in 50 parts of deionized water and a mixture of 45 parts of methyl methacrylate, 20 parts of styrene, 25 parts of n-butyl acrylate and 10 parts of hydroxy propyl acrylate were simultasneously dropped in and the mixture was reacted to obtain an aqueous dispersion varnish E having a non-volatile content of 40%.

EXAMPLE 1

An antifouling coating composition was prepared by mixing 100 parts of the varnish B obtained in Reference Example 9, 20 parts of the polymer microparticles obtained in Reference Example 7 and 10 parts of xylene. It was determined that the maximum film thickness showing no sagging with this composition was 220 microns.

Onto a sand-blasted steel plate previously coated with an anti-corrosive paint, the aforesaid coating composition was applied so as to give a coating of 100 dry thickness. Thus obtained test plate was attached to Discrotor, immersed in sea water (18° to 23° C.) and rotated at a constant speed for 60 days (days and nights).

Use-up rate of the coating was determined by measuring the film thickness and using the following equation.

$$\text{Use-up rate} = \frac{\text{initial film thickness} - \text{final film thickness}}{\text{initial film thickness}}$$

It was found that the use-up rate was 0.22.

Next, the test plate was subjected to an antifouling test in sea water at Aioi Bay, Hyogo Ken, Japnan.

It was found that after 6 months' immersion in sea water, the surface area having adhered marine life was 0%.

COMPARATIVE EXAMPLE 1

An antifouling coating composition was prepared as in Example 1 but omitting the polymer microparticles. The composition was evaluated and tested under the same conditions as stated in Example 1 and it was found that the maximum film thickness showing no sagging was 90 microns, the use-up rate was 0.04 and surface area adhered with submarine livings in immersion test was 2%.

EXAMPLES 2 TO 7 AND COMPARATIVE EXAMPLES 2 TO 3

Using the polymer microparticles obtained in Reference Examples 4 to 8 and the varnishes B to E obtained in Reference Examples 9 to 12 and following the prescriptions given in the following Table 1, various antifouling coating compositions were prepared. These were evaluated and tested according to the procedures given in Example 1, and the test results were shown in Table 1.

TABLE 1

| polymer microparticles | Reference Example | Ex. 2 | Ex. 3 | Ex. 4 | Ex. 5 | Ex. 6 | Ex. 7 | Comp. Ex. 2 | Comp. Ex. 3 |
|---|---|---|---|---|---|---|---|---|---|
|  | 4 | 20 |  |  |  |  | 20 |  |  |
|  | 5 |  |  | 10 |  |  |  |  |  |
|  | 6 |  | 20 |  |  |  |  |  |  |
|  | 7 |  |  |  | 30 |  |  |  |  |
|  | 8 |  |  |  |  | 30 |  |  |  |
| varnish |  |  |  |  |  |  |  |  |  |
| B | 9 | 100 |  |  |  |  |  |  |  |
| C | 10 |  | 80 | 80 |  |  |  | 80 |  |
| D | 11 |  |  |  | 100 | 100 |  |  | 100 |
| E | 12 |  |  |  |  |  | 100 |  |  |
| cuprous oxide |  |  |  |  | 20 | 20 | 10 |  | 20 |
| triphenyl tin fluoride |  | 2 | 2 | 2 |  |  |  | 2 |  |
| xylene |  | 15 | 15 | 10 | 20 | 20 |  | 10 | 10 |
| use-up rate |  | 0.29 | 0.38 | 0.32 | 0.19 | 0.15 | 0.17 | 0.20 | 0.00 |
| antifouling test (surface area % adhered with submarine livings) |  | 0 | 0 | 0 | 0 | 0 | 1 | 0 | 15 |

What is claimed is:

1. An antifouling coating composition consisting essentially of
    (a) a film-forming synthetic resin
    (b) a solvent in which the synthetic resin is soluble or dispersible, and
    (c) crosslinked polymer microparticles having a mean diameter of about 0.01 to 50 microns and having an antifouling agent copolymerized therewith,
    said antifouling agent being an esterification product of a metallic compound selected from the group consisting of Cu, Ni, Co, Zn, Mn, Mg, Ba, Ca and Sn with carboxylic bearing ethylenically unsaturated monomers
    the polymer microparticles being crosslinked acrylic polymer microparticles directly prepared by either emulsion polymerization, suspension polymerization, NAD method or precipitation polymerization of ethylenically unsaturated monomers including a crosslinking monomer and said antifouling agent and being insoluble in the solution of said synthetic resin in said solvent and uniformly dispersed therein and
    at least one of said (a) and (c) being of a hydrolyzable nature.

2. The composition according to claim 1, wherein the film-forming synthetic resin is of hydrolyzable nature and the crosslinked polymer microparticles carrying an antifouling agent are of hydrolyzable or non-hydrolyzable nature.

3. The composition according to claim 1, wherein the film-forming synthetic resin is of non-hydrolyzable nature and the crosslinked polymer microparticles carrying an antifouling agent are of hydrolyzable nature.

4. The composition according to claim 1, wherein the film-forming synthetic resin is selected from the group consisting of polyester resin, acrylic resin, epoxy resin, polyvinyl chloride resin, polyvinylidene chloride resin, acryl-vinylacetate resin, chlorinated rubber, urethane resin and boiled oil.

5. The composition according to claim 1, wherein the crosslinked polymer microparticles are obtained by the copolymerization of ethylenically unsaturated monomers including crosslinkable monomer.

6. The composition according to claim 1, wherein said antifouling agent is incorporated in the crosslinked polymer microparticles as a constituting unit thereof.

7. The composition according to claim 1, wherein said antifouling agent is occluded in or adhered on the crosslinked polymer microparticles.

8. The composition according to claim 1 further containing an additional antifouling agent.

* * * * *